2,802,010

FLUORINATED COMPOUNDS CONTAINING NITROGEN AND OXYGEN

Murray Hauptschein, Philadelphia, Pa., and Robert A. Braun, Harford County, Md., assignors, by mesne assignments, to Pennsalt Chemicals Corporation, a corporation of Pennsylvania No Drawing. Application May 24, 1956, Serial No. 586,902

12 Claims. (Cl. 260—297)

This invention relates to adducts of perfluoroheptane-4,4-diol and certain tertiary amines, and to a process for making the same.

The need for chemically and thermally stable organic compounds has led in recent years to the development of a wide variety of organic fluorine compounds. Such materials have had increasingly wide usage as lubricants, elastomers, heat transfer fluids, plastics, aerosol propellants and refrigerants, among other applications. In various fields the need has been felt for compounds possessing the stability of organic fluorine compounds which would also have surface activity. Compounds of this nature are called for, for example, as lubricant and coolant additives to aid in scouring undesirable deposits from the system in which they are used.

The tendency of fluorinated ketones to form hydrates has been known for many years, although pure hydrates had not been obtained until quite recently. In copending application, Serial No. 587,942, filed May 29, 1956, of Murray Hauptschein, the production of perfluoroheptane-4,4-diol by simple addition of water to perfluoroheptane-4-one is described and claimed.

It has now been discovered that certain tertiary amines form stable addition products or adducts with perfluoroheptane-4,4-diol which have valuable surface active properties, and the present invention therefore comprises as a new composition of matter, the adduct of perfluoroheptane-4,4-diol and a tertiary amines of the class described below.

The invention also comprises a method for making new surface active compounds which comprises reacting perfloroheptane-4,4-diol with a tertiary amine of the class described below.

The tertiary amines which are useful in the present invention are acyclic amines having the general formula

where $R_1$ is selected from the group consisting of aryl radicals and alkyl radicals having not more than about 6 carbon atoms and where $R_2$ and $R_3$ are alkyl radicals having not more than about 6 carbon atoms; and cyclic amines at least as basic as pyridine.

Examples of suitable amines are trimethylamine, triethylamine, 2-ethylhexylamine, benzyldimethylamine, dimethylaniline, pyridine, picoline and lutidine.

No special conditions are necessary for the reaction. Immediately upon bringing the diol and the amine together at room temperature, a spontaneous and vigorous reaction occurs and the adduct may be recovered substantially immediately.

It is, of course, possible to carry out the reaction at elevated temperatures up to about 75° C. at which point the diol begins to dissociate. At elevated pressures, it is possible to use even higher temperatures. The reaction may also be conducted at temperatures below room temperature, down to about −80° C.

The adducts are in general substantially equimolar, i. e. one mole of amine adds to one mole of diol. In conducting the reaction, equimolar quantities of the reactants may be used, although usually an excess of amine, up to about 10 times, but preferably not more than twice the equimolar amount, is employed. Using less than an equimolar amount of amine simply results in less than all of the diol being reacted.

Pressure is not a critical factor. The reaction may be conducted at sub- or superatmospheric pressures, say from 0.1 to 100 atmospheres, but in general it is preferred to operate at atmospheric pressure. As for reaction time, as indicated, the reaction takes place nearly instantaneously at room temperature with most amines.

The invention will be further described with reference to the following specific examples, it being understood that the examples are given for purposes of illustration only and are not to be taken as in any way restricting the invention beyond the scope of the appended claims.

Example I

Perfluoroheptane-4,4-diol (2.34 g., 0.006 mole) was treated with an excess of anhydrous triethylamine (1.13 g., 0.01 mole). At room temperature there was a vigorous exothermic reaction and a white crystalline product formed immediately. The product was purified by recrystallization from benzene. The yield of $$C_3F_7C(OH)_2C_3F_7 \cdot N(C_2H_5)_3$$

was 2.8 g. (95%), M. P. 87.5–88.5° C.

Analysis, calculated for $C_{13}H_{17}F_{14}NO_2$: C, 32.16; H, 3.50. Found: C, 32.06; H, 3.70. The infra-red spectrum showed a hydroxyl band at 2.85μ.

Example II

The procedure of Example I was carried out, except that the product was purified by sublimation at 100° C. An identical product was obtained.

Example III

The procedure of Example I was carried out using a slight molar excess of 2-ethylhexyldimethylamine. A solid product,

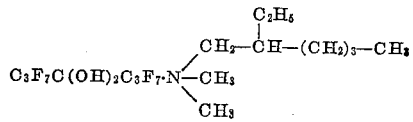

was obtained, which melted at 57–57.5° C.

Example IV

The procedure of Example I was carried out using a slight molar excess of benzyldimethylamine. A liquid product,

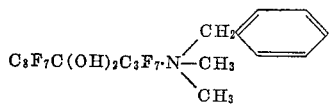

was obtained.

Example V

The procedure of Example I was carried out using a slight molar excess of dimethylaniline. A liquid product,

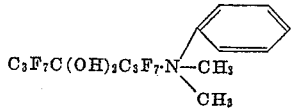

was obtained.

Example VI

The procedure of Example I was repeated using a slight molar excess of pyridine. A liquid product, C₃F₇C(OH)₂C₃F₇·N

was obtained.

What is claimed is:

1. A stable adduct of perfluoroheptane-4,4-diol and a tertiary amine selected from the group consisting of acyclic amines having the general formula

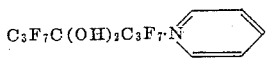

where $R_1$ is selected from the group consisting of the phenyl radical and alkyl radicals having from 1 to 8 carbon atoms and $R_2$ and $R_3$ are selected from the group consisting of alkyl radicals having from 1 to 8 carbon atoms; and heterocyclic amines selected from the group consisting of pyridine, picoline and lutidine.

2. A stable adduct of perfluoroheptane-4,4-diol and triethylamine.

3. A stable adduct of perfluoroheptane-4,4-diol and 2-ethylhexyldimethylamine.

4. A stable adduct of perfluoroheptane-4,4-diol and benzyldimethylamine.

5. A stable adduct of perfluoroheptane-4,4-diol and dimethylaniline.

6. A stable adduct of perfluoroheptane-4,4-diol and pyridine.

7. A method of forming stable fluorinated compounds which comprises reacting perfluoroheptane-4,4-diol with a tertiary amine having the formula

where $R_1$ is selected from the group consisting of the phenyl radical and alkyl radicals having from 1 to 8 carbon atoms and $R_2$ and $R_3$ are selected from the group consisting of alkyl radicals having from 1 to 8 carbon atoms; and heterocyclic amines selected from the group consisting of pyridine, picoline and lutidine.

8. The process claimed in claim 7 in which the amine is triethylamine.

9. The process claimed in claim 7 in which the amine is 2-ethylhexyldimethylamine.

10. The process claimed in claim 7 in which the amine is benzyldimethylamine.

11. The process claimed in claim 7 in which the amine is dimethylaniline.

12. The process claimed in claim 7 in which the amine is pyridine.

No references cited.